United States Patent
Karsten

(10) Patent No.: US 10,269,327 B2
(45) Date of Patent: Apr. 23, 2019

(54) DISPLAY CONTROL

(71) Applicant: Zero360, Inc., Seattle, WA (US)

(72) Inventor: Peter Karsten, Windsor (GB)

(73) Assignee: ZERO360, INC., Seattle, WA (US)

( * ) Notice: Subject to any disclaimer, the term of this patent is extended or adjusted under 35 U.S.C. 154(b) by 0 days.

(21) Appl. No.: 15/239,893

(22) Filed: Aug. 18, 2016

(65) Prior Publication Data
US 2017/0193965 A1 Jul. 6, 2017

Related U.S. Application Data

(63) Continuation of application No. PCT/GB2015/050472, filed on Feb. 18, 2015.

(30) Foreign Application Priority Data

Feb. 18, 2014 (GB) .................. 1402879.9

(51) Int. Cl.
G06F 1/32 (2006.01)
G09G 5/00 (2006.01)
G09G 5/10 (2006.01)
G06F 3/0488 (2013.01)
G06F 1/3218 (2019.01)
G06F 1/3234 (2019.01)

(52) U.S. Cl.
CPC .............. G09G 5/10 (2013.01); G06F 1/3218 (2013.01); G06F 1/3265 (2013.01); G06F 3/04883 (2013.01); G06F 3/04886 (2013.01); G09G 5/003 (2013.01); G06F 2203/04803 (2013.01); G09G 2320/0626 (2013.01); G09G 2320/0686 (2013.01); G09G 2320/08 (2013.01); G09G 2330/021 (2013.01); G09G 2330/023 (2013.01); G09G 2354/00 (2013.01); G09G 2360/144 (2013.01); Y02D 10/153 (2018.01)

(58) Field of Classification Search
CPC ............. G06F 3/04883; G06F 3/04886; G06F 1/3218; G06F 1/3265; G09G 5/003; G09G 5/10
USPC ......... 345/156–184, 89, 420, 440, 589, 619, 345/690; 725/28, 90; 386/231
See application file for complete search history.

(56) References Cited

U.S. PATENT DOCUMENTS

| 5,327,344 A * | 7/1994 | Hoffman | G07C 5/0825 340/439 |
| 7,623,689 B2 * | 11/2009 | Shigeta | G06K 9/0004 283/68 |
| 7,878,506 B1 * | 2/2011 | Kelly | A63F 7/0058 273/118 A |

(Continued)

FOREIGN PATENT DOCUMENTS

| WO | WO 2013/100937 | 7/2013 |
| WO | WO 2015/124927 | 8/2015 |

OTHER PUBLICATIONS

International Search Report and the Written Opinion dated Jun. 24, 2015 From the International Searching Authority Re. Application No. PCT/GB2015/050472.

*Primary Examiner* — Prabodh M Dharia

(74) *Attorney, Agent, or Firm* — Ziegler IP Law Group, LLC

(57) ABSTRACT

A method for controlling a display includes segmenting the display; assigning an importance level to at least one of the segments; and selectively setting the luminance of said segment in dependence on its importance level.

20 Claims, 3 Drawing Sheets

(56) References Cited

U.S. PATENT DOCUMENTS

| | | | |
|---|---|---|---|
| RE42,366 E * | 5/2011 | Horikawa | G06T 17/20 345/420 |
| 9,153,966 B2 * | 10/2015 | Ishida | B60L 11/1816 |
| 9,186,077 B2 * | 11/2015 | Ma | A61B 5/02438 |
| 2002/0171646 A1 * | 11/2002 | Kandogan | G06T 11/206 345/440 |
| 2003/0121046 A1 * | 6/2003 | Roy | G06K 9/00536 725/90 |
| 2003/0135288 A1 | 7/2003 | Ranganathan et al. | |
| 2004/0145593 A1 * | 7/2004 | Berkner | G06F 17/30905 345/619 |
| 2005/0267676 A1 * | 12/2005 | Nezu | B60K 35/00 701/532 |
| 2006/0078288 A1 * | 4/2006 | Huang | G11B 27/034 386/231 |
| 2006/0087502 A1 | 4/2006 | Karidis et al. | |
| 2006/0101293 A1 | 5/2006 | Chandley et al. | |
| 2007/0075950 A1 * | 4/2007 | Yamada | G09G 3/3648 345/89 |
| 2007/0199014 A1 * | 8/2007 | Clark | H04N 5/44543 725/30 |
| 2008/0002771 A1 * | 1/2008 | Chen | H04N 19/139 375/240.16 |
| 2008/0019574 A1 * | 1/2008 | Scalise | G06K 9/00228 382/118 |
| 2008/0122857 A1 * | 5/2008 | Hsuan | G06T 5/009 345/589 |
| 2008/0184149 A1 * | 7/2008 | Cohen | G06F 3/04815 715/771 |
| 2009/0077137 A1 * | 3/2009 | Weda | G06F 17/30843 |
| 2010/0250984 A1 | 9/2010 | Lee et al. | |
| 2010/0274673 A1 * | 10/2010 | Isaac | G06Q 30/02 705/14.73 |
| 2011/0184810 A1 * | 7/2011 | Dharmaji | G06Q 30/02 705/14.64 |
| 2011/0225494 A1 * | 9/2011 | Shmuylovich | G06F 3/04883 715/705 |
| 2011/0304536 A1 | 12/2011 | Chen | |
| 2012/0101444 A1 * | 4/2012 | Muller-Pathle | A61M 5/14244 604/189 |
| 2012/0210277 A1 | 8/2012 | Bowen et al. | |
| 2012/0324260 A1 * | 12/2012 | Kezuka | H04N 5/57 713/320 |
| 2013/0063404 A1 * | 3/2013 | Jamshidi Roudbari | G06F 3/044 345/204 |
| 2013/0100176 A1 * | 4/2013 | Lewis | G09G 5/02 345/690 |
| 2013/0127926 A1 * | 5/2013 | Lewis | G09G 5/00 345/690 |
| 2013/0217978 A1 * | 8/2013 | Ma | A61B 5/02438 600/301 |
| 2013/0222396 A1 * | 8/2013 | Confrey | G06T 11/60 345/473 |
| 2013/0238540 A1 * | 9/2013 | O'Donoghue | G06N 5/02 706/46 |
| 2013/0314301 A1 * | 11/2013 | Feehan | G06F 3/1423 345/2.1 |
| 2014/0075234 A1 * | 3/2014 | Stekkelpak | H04M 1/72569 713/340 |
| 2014/0078185 A1 * | 3/2014 | Pu | G09G 3/3466 345/690 |
| 2014/0125150 A1 * | 5/2014 | Alberth, Jr. | G05B 15/02 307/126 |
| 2014/0139486 A1 * | 5/2014 | Mistry | G06F 3/0304 345/175 |
| 2014/0163707 A1 * | 6/2014 | Logan | G06F 17/30053 700/94 |
| 2014/0285531 A1 * | 9/2014 | Dasher | G09G 5/10 345/690 |
| 2014/0310739 A1 * | 10/2014 | Ricci | H04W 48/04 725/28 |
| 2014/0350716 A1 * | 11/2014 | Fly | G06F 1/3212 700/215 |
| 2015/0066837 A1 * | 3/2015 | Twarog | B60L 11/1851 706/58 |
| 2015/0138203 A1 * | 5/2015 | Nachmanson | G06T 11/206 345/440 |
| 2015/0257103 A1 * | 9/2015 | Detter | H04W 52/0225 370/241 |
| 2016/0003428 A1 * | 1/2016 | Anderson | F21S 8/033 362/147 |
| 2016/0198233 A1 * | 7/2016 | Spielman | G06Q 20/123 725/5 |
| 2016/0226713 A1 * | 8/2016 | Dellinger | H04L 41/12 |
| 2016/0357232 A1 * | 12/2016 | Kalyanasundaram | G06F 1/206 |
| 2017/0140170 A1 * | 5/2017 | DiBona | G06F 21/6218 |
| 2018/0144591 A1 * | 5/2018 | Sartee | G06F 1/1632 |

* cited by examiner

DISPLAY CONTROL

RELATED APPLICATIONS

This application is a Continuation of PCT Patent Application No. PCT/GB2015/050472 having International filing date of Feb. 18, 2015, which claims the benefit of priority of United Kingdom Patent Application No. 1402879.9 filed on Feb. 18, 2014. The contents of the above applications are all incorporated by reference as if fully set forth herein in their entirety.

FIELD AND BACKGROUND OF THE INVENTION

The present invention relates to a method for controlling a display, an associated device, and a computer program product.

A wide variety of portable devices include screens to display information; examples include (but are not limited to) mobile phones, smartphones, tablets and wearable devices (such as 'smartwatches'). These devices are generally powered by an on-board battery, which can only provide power for a finite time period. One of the principal drains of battery power is the display screen, particularly those on devices with large, bright screens.

In order to conserve battery life it is desirable to minimise the power consumption of the display. For this reason, many devices have a 'sleep' mode whereby the screen is turned off after a predetermined period of inactivity.

Another method of reducing display power consumption by a screen is disclosed in U.S. Pat. No. 8,194,092 B2 which describes a method for processing pixels on the display to filter out particularly energy intensive aspects (such as white backgrounds). Such processing may however have a detrimental impact on a user's experience.

An alternative method of reducing display power consumption would therefore be desirable.

SUMMARY OF THE INVENTION

According to one aspect of the invention, there is provided a method for controlling a display, the method comprising: segmenting the display; assigning an importance level to at least one of the segments; and selectively setting the luminance of said segment in dependence on its importance level.

Preferably, the setting of the luminance of said segment comprises supplying power to the segment, the level of power being determined by the importance level assigned to that segment.

Preferably, the level of power supplied determines the luminance of said segment.

Preferably, the available battery charge required to power said display is determined.

Preferably, the method comprises setting the luminance of a segment in dependence on the available battery charge, and preferably setting the relative luminance of each of a plurality of segments in dependence on their relative assigned importance levels and the available battery charge.

Preferably, future battery usage is predicted.

Preferably, the luminance of a segment is set in dependence on the predicted future battery usage.

Preferably, the future battery usage comprises anticipated user behaviour.

Preferably, the predicted battery usage is determined based on anticipated usage of the battery.

Preferably, the segment is defined by software.

Preferably, said software defined segment is defined by a graphical interface element.

Preferably, the position and/or geometry of said software segment varies, preferably in dependence on the operation of an underlying software application.

Preferably, the segment is defined by a particular physical area of the display, and preferably wherein the geometry of the area is configurable.

Preferably, the assigning of an importance level to a segment is based on one or more user inputs.

Preferably, the display is a touchscreen and the user input comprises a pinch action on said display.

Preferably, the user input comprises finger proximity to a device.

Preferably, the user input comprises movement of a device.

Preferably, the device includes said display.

Preferably, the device is a separate device to the device including said display.

Preferably, importance levels are assigned without any direct user interaction.

Preferably, importance levels are determined and/or assigned based on at least one or more of the following: environmental conditions in which the display is located; a detected location of the display; a detected motion of the display; a user operating mode; and the nature and/or type of graphical interface elements being displayed.

Preferably, importance levels are determined and/or assigned based on an ambient light level.

Preferably, an importance level is assigned based on a calendar event.

Preferably, a calendar application is assigned an importance level in dependence on a calendar event.

Preferably, importance levels are determined and/or assigned based on received biometric data.

Preferably, the biometric data comprises heart rate data.

Preferably, an importance level is determined based on the information being displayed on a segment.

Preferably, the method further comprises providing a user interface for segmenting the display.

Preferably, a user interface for assigning one or more importance levels to segments of a display is provided.

Preferably, there is provided a computer program product adapted to carry out the above-mentioned method.

Preferably, there is provided a device adapted to carry out the above-mentioned method.

Preferably, there is provided a device programmed with the computer program product.

According to another aspect of the invention, there is provided a device having a display, the device comprising: means for segmenting the display; means for assigning an importance level to at least one segment; and means for selectively setting the luminance of said segment in dependence on its importance level.

Preferably, the device is portable.

Preferably, the device is in the form of a smartphone.

Preferably, the device is in the form of a wearable device.

Preferably, the device comprises a user interface for segmenting the display.

Preferably, the device comprises a user interface for assigning one or more importance levels to the segments.

Further features of the invention are characterised by the appended claims.

The invention extends to methods and/or apparatus substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Furthermore, features implemented in hardware may generally be implemented in software, and vice versa. Any reference to software and hardware features herein should be construed accordingly.

BRIEF DESCRIPTION OF THE SEVERAL VIEWS OF THE DRAWINGS

The invention extends to a method, computer program product and device as described herein and/or substantially as illustrated with reference to the accompanying drawings.

These and other aspects of the present invention will become apparent from the following exemplary embodiments that are described with reference to the following figures in which.

DESCRIPTION OF SPECIFIC EMBODIMENTS OF THE INVENTION

Reducing the power supplied to the display may assist in reducing power consumption of a device. For displays using technologies such as Organic Light Emitting Diodes (OLEDs), this means keeping the display largely dark to conserve battery power. Conserving battery power increases the length of time between charges, reduces the running cost of the device and extends the useful lifetime of the battery, which may degrade with each charge cycle.

Variable power user interface displays can be operated at a low power with minimum luminosity, or at a higher power for higher luminosity under certain conditions.

The terms 'display' and 'screen' are used interchangeably herein.

Figure 1:
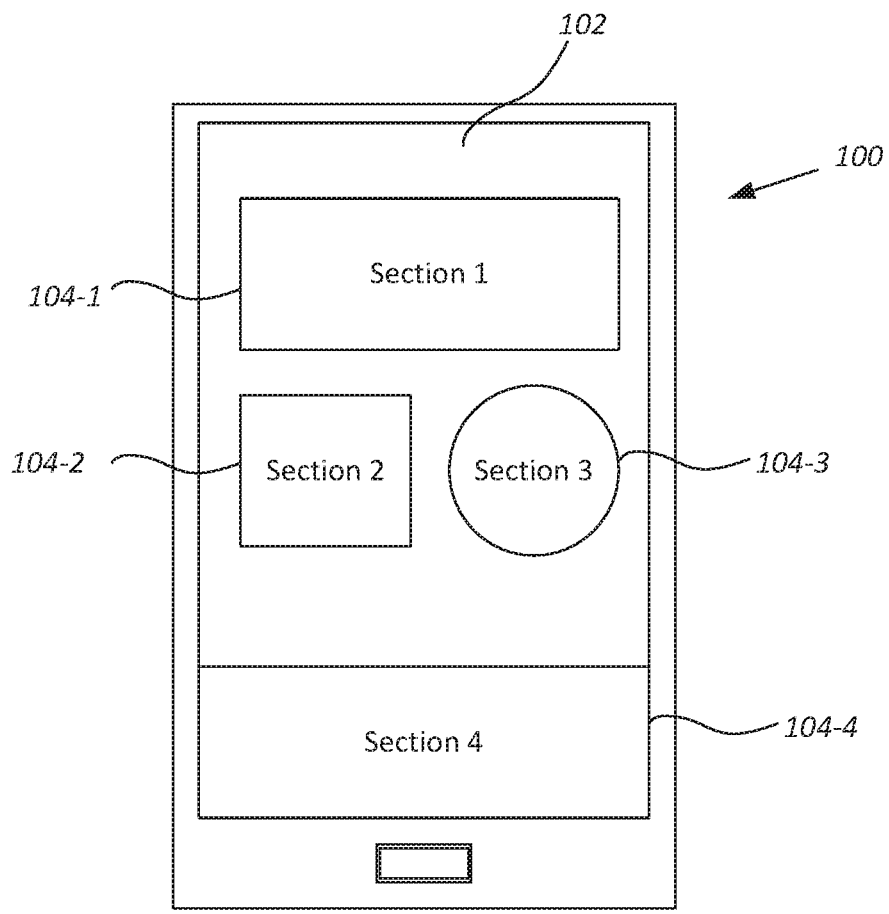
FIG. 1 shows a device according to an embodiment of the present invention with a segmented display.

FIG. 1 shows a display area 102 of a mobile device 100 segmented into several areas 104. This segmentation may be based on hardware (e.g. the physical location of the segment on the display 102) or software (e.g. different areas of the screen being assigned dynamically to different processes, sources of information, or software application graphical interface elements), thus forming User Interface segments ("UI segments").

Figure 2:
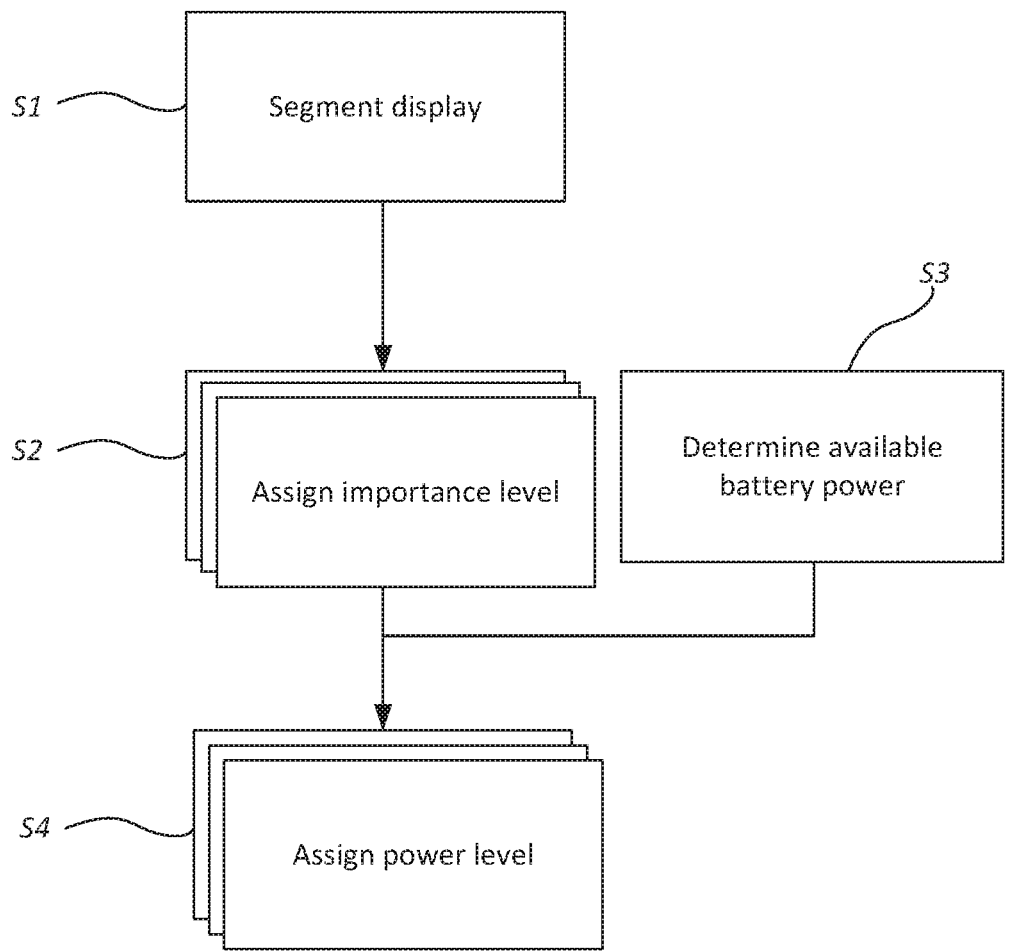
FIG. 2 shows a flow-diagram of a method of selectively setting the luminance of one or more display segments.

FIG. 2 illustrates the process or method by which the luminosity or brightness of one or more segments 104 of the display 102 of the device 100 is selectively set or adjusted.

The first step S1 in the process is to segment the display 102. The display is segmented using either hardware segmentation, software segmentation, or a combination of both hardware and software segmentation.

Hardware segmentation involves defining segments on fixed portions of the display 102, regardless of what is being displayed in those segments. An example of this would be the bottom 320 pixel rows of the screen 102 (as illustrated by 104-4 in FIG. 1). A hardware defined segment is independent of what is being displayed, and may be repositioned or adjusted independently of what is being displayed, for example a user may position a hardware segment so that it is located over a certain portion of the screen 102 thereby to ensure that certain graphical interface elements are contained within a particular segment. Alternatively, a user might drag certain graphical interface elements into a hardware segment.

Software segmentation involves defining certain displayed graphical interface elements as software segments, regardless of where such segments are located on the physical display 102. An example of this would be a particular graphical interface element of a software application (app) being displayed on the screen 102 (as illustrated by 104-1, -2 or -3 in FIG. 1). A software defined segment might be located in different positions on the display 102, or might move depending on the operation of the software application.

A segment 104 may have any shape, and may also change shape (for example, changing shape so as to conform to the shape of an app's interface). A segment 104 may be defined on a local or remote display, or on multiple displays. An example of an arrangement of multiple, separate displays is a smartwatch 'paired' (via a wireless link such as Bluetooth®) with a smartphone. In this case, a certain app may be displayed only on the smartwatch, or on both devices, but potentially in a different form or shape.

In the next step S2 in the process an importance level is assigned to one or more of the segments 104. One or more segments 104 may be selected to appear at a higher luminance than the rest of the display 102 and/or other segments 104 depending on their relative importance. This then enables battery power usage to be prioritised to those parts of the screen 102 (segments 104) having a higher importance. This decreases the overall power consumption without having an overall adverse impact on the user experience.

Not all information shown to the user is of the same importance. Certain information is very important, and other information is less important, depending on an operating mode.

The operating mode is a detected (or user selected) mode in which the device is operating, for example 'social mode', 'work mode' or 'sports mode'. A collection of importance levels are assigned to particular segments when a particular mode is selected. For example, when in 'social mode' social media applications would be assigned a greater importance level than, say, a calendar application.

In each operating mode, each type of information provided to the end user will have an assigned importance level. Each importance level can be associated with the amount of power that should be allocated to a segment 104.

A user may also select one or more segments 104 (either defined by hardware or software), whereupon action can be taken based on the selection. Selection of segments can be performed locally and/or remotely.

Local selection involves the user interacting directly with the display 102 on which the selection is being made.

Remote selection involves a remote event causing a selection. Remote selection includes selections such as touching a neighbouring display which is adapted to control another display (for example, via a wireless link such as Bluetooth®) or selecting a time period in someone else's calendar making the calendar event (for example) of greater importance. An example of such a scenario is where a personal assistant selects a calendar item in an executive's calendar, which then increases the power only for related events on the executive's display 102.

As mentioned above, the assignment or selection of importance levels to segments can be performed automatically and/or manually.

Manual assignment involves the user directly assigning particular segments an importance level, for example, by touching the display 102, finger proximity to the display 102, or movement of the device 100 incorporating the display 102. One example of manual assignment is a user touching a (touchscreen) display, causing that part of the display to light up. Manual selection may also be performed by pointing or with a gesture, such as a three finger "pinch" action. In this manner, a user may select one or more segments and adjust their relative levels of importance, and hence their relative share of the available battery power (i.e. their relative luminance). Such manual modifications to the relative importance levels may be performed in a dedicated user interface, as is described in more detail below.

Automatic assignment includes an assignment based on one or more indirect triggers, for example an increase in ambient light, a pending calendar event, the detected location of the display or device, the detected motion of the display or device, or a change in received biometric data information. For example, if it is detected that the user is running (e.g. by an elevated heart rate), a sport application may be assigned a higher importance level than, say, a social networking application. Alternatively (or in addition) the detection of such inputs may automatically switch the device into a specific mode, assigning a collection of importance levels to a variety of segments.

The step of determining the available battery power is shown at step S3.

The anticipated available battery power is determined based on the current level of charge of the battery, in combination with known and anticipated behaviour of the user.

Such anticipated behaviour may be inputted by a user directly and/or predicted by the device based on previous user usage data.

An example of user inputted future behaviour (usage information) is a calendar appointment for a phone call, the device would be able to predict how much battery power would be needed for such a phone call and then apportion the remaining battery power to other tasks accordingly.

An example of predicted behaviour (usage information) is if a user usually uses their device to listen to music on their commute home from work, and the device detects that the user is at work; this anticipated usage—that the user will listen to music on the commute home—can then be taken into account when apportioning power usage to various segments 104 of the screen 102.

If there is little expected available battery one example of information on the device 100 display 102 that may be apportioned little or no battery power is weather information, since this may not be the most important item to show the user. This might however depend on the operating mode.

One or more of the following factors are then used to assign or apportion appropriate power levels to each of the segments based on their relative importance: anticipated user behaviour; the physical parameters of the device such as battery charge level; and the known power consumption rates for communications, screen illumination and other operations. Step S4 illustrates a power level being assigned to the or each segment based on their relative importance.

Table 1 below shows an exemplary selection of applications, their relative importance levels, corresponding allocated battery power share, and segment brightness associated with their corresponding graphical interface elements.

TABLE 1

Example importance levels of certain segments and their associated battery share

| Display segment | Importance level | Available battery share | Display segment brightness |
| --- | --- | --- | --- |
| Weather application | Very low | 5% | Very low/off |
| Social networking application | Low | 10% | Low |
| Calendar application | Medium | 40% | Medium |
| Top 200 pixel rows | High | 45% | High |

The allocation of battery share between different applications as shown in Table 1 might change depending on the operating mode. In Table 1 the operating mode might be a "work" mode, in which the calendar application is given a higher priority importance level, whereas if the device were in a "social" mode, the social networking application might be given a higher priority.

In the case of hardware segments, the various hardware segments would each be assigned a particular percentage of the available battery power share.

Figure 3:
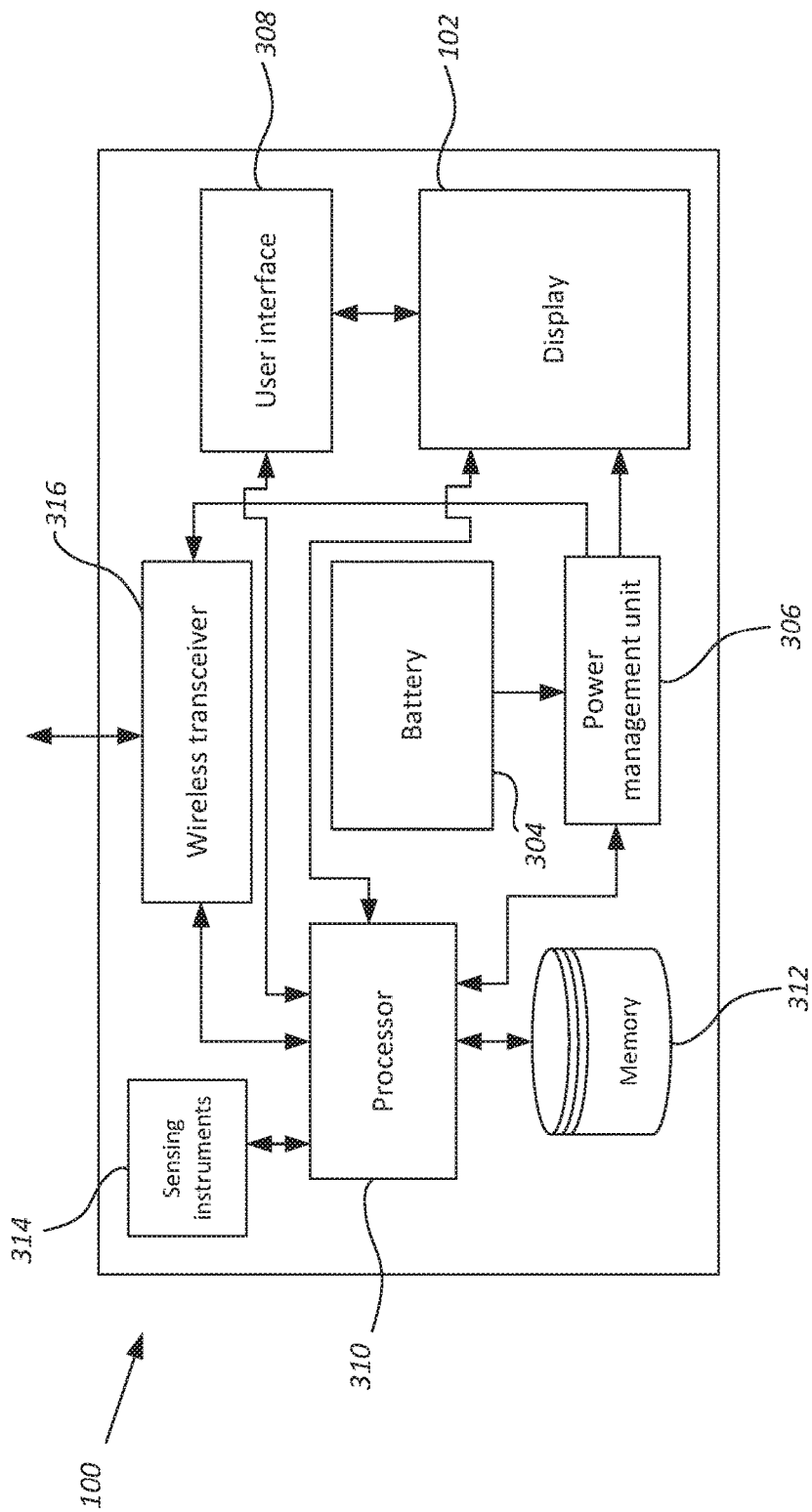
FIG. 3 is a schematic hardware diagram of the device of FIG. 1.

FIG. 3 shows a schematic hardware diagram of the portable device 100 with a display 102 that may be segmented. The device 100 is powered by a battery 304, with power being supplied by the battery to the various components via a power management unit 306. A user interface 308 is provided which allows a user to interact with the device 100 using the display 102 and to select segments of the display 102 and input information which may be used to determine importance levels. Such information is processed by processor 310 and stored in associated memory 312.

Sensing instruments 314, such as Global Positioning System (GPS) circuitry and accelerometers are also provided, with the information from these devices being similarly processed and stored. A wireless transceiver 316 may also be provided for receiving and/or transmitting information to and from remote devices (not shown).

The power management unit 306 is operable to measure the status of charge of the battery, and pass this information via the processor 310 for storage in memory 312. The processor 312 uses this state of charge information, together with known power usage rates, to determine the available battery power and then allocate this to the segments of the display 102 as described above.

The device 100 may also be provided with a segmentation interface software tool or application to display to a user the anticipated power consumption profile information for a particular operating mode (for example, expected power usage profiles based on segments having a particular assigned importance level). Such information may be used by a user to determine whether to adjust the importance levels assigned to each segment. This tool may be activated by a specific action, for example a three finger 'pinch' which switches from a view whereby users interact with apps etc. to one in which the user can select and adjust segments. Alternatively, activating the tool may be initiated remotely (e.g. via a connected device) or automatically (e.g. if the battery state of charge falls below a certain value).

Using the segmentation tool a user can select a segment (e.g. a particular app) and manually adjust its importance level and hence luminance. A gesture such as pinching can be used to vary the power provided to a segment or group of segments.

In use, a user may use the abovementioned segmentation tool to assign importance levels to segments and alter the importance levels assigned to segments. This may be based on known future usage, for example, (the user may lower the importance level of a weather app as the user knows she will be inside, or based on information provided to the user by the tool (e.g. a particular segment is expected to consume a large amount of power).

The assignment of importance levels may alternatively be automated by the device in dependence on known parameters and/or expected future usage. Automation is advantageous in that the power consumption can be adapted quickly when new information becomes available, which may result in improved performance (e.g. extended battery life). However, certain users may wish to customise their display and feel that automation does not accurately reflect their desired usage. A combination of automation and manual operation may be preferable in such situations, where a user can manually assign importance levels for certain segments, and the segments which are not manually assigned may be automatically assigned importance levels by the device in dependence on known parameters and/or expected future usage.

Alternatives and Modifications

The above description has been primarily concerned with portable devices whereby battery conservation is the driving factor for controlling the luminance of the display. However, the same principle equally applies to devices where battery conservation is not necessarily an issue, such as Personal Computers (PCs), screens in vehicles, photocopier screens or supermarket checkout screens. The advantages of conserving power in such scenarios would reduce the running costs of such devices and reduce wear on screen components.

Furthermore, setting the luminance of different segments in dependence of an assigned importance level has the advantage of highlighting information perceived to be important to a user, thus improving the user's experience of the device and its efficiency. Displaying a large amount of information may overwhelm a user and increase the time taken for a user to retrieve further information.

In one embodiment, selecting a segment causes power to be applied to the selected segment, allowing that segment to be seen while saving power on other segments which remain at a lower power. In such a scenario, the entire screen may be kept at a very low (or no) luminance and when a certain segment is selected (e.g. tapped or swiped) the luminance is increased for a pre-determined length of time. Effectively, a temporarily higher importance level is assigned to a segment by a user selecting (e.g. touching) a segment.

Further features and/or advantages of the invention are provided below:

A selection, local and/or remote, automatic and/or manual, that causes a hardware or software segment of a display to be activated or brightened for enhanced visibility.

A selection, local and/or remote, automatic and/or manual, that causes a hardware or software segment of a display to be de-activated or dimmed for reduced power consumption.

A selection, local and/or remote, automatic and/or manual, that causes a change of user interface mode (UI mode) for power management purposes.

A selection of a segment, local and/or remote, automatic and/or manual, drives the UI mode for power management purposes.

A selection of a segment, local and/or remote, automatic and/or manual, drives the power management for the segment in question and/or some other segments.

Using a gesture such as a pinch to control the UI mode.

Using a gesture such as a pinch to increase or decrease brightness for a segment or group of segments.

Using a gesture such as a pinch to increase or decrease the brightness for a whole user interface.

Using a gesture such as a pinch to increase or decrease the brightness on a remote or secondary display.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals and/or subtitles appearing in the claims are by way of illustration only and shall have no limiting effect on the scope of the claims.

What is claimed is:

1. A method for controlling a display, the method comprising:
segmenting the display into two or more simultaneously visible segments;
assigning an importance level to individual ones of the two or more simultaneously visible segments; and
selectively setting a luminance of the individual ones of the two or more simultaneously visible segments in dependence on the assigned importance level as well as predicted future battery usage.

2. A method according to claim 1 wherein the setting of the luminance of the individual ones of the two or more simultaneously visible segments comprises supplying power to the individual ones of the two or more simultaneously visible segments, a level of the power delivered to the individual ones of the two or more simultaneously visible segments being determined by the importance level assigned to the individual ones of the two or more simultaneously visible segments.

3. A method according to claim 2 wherein the level of power supplied to the individual ones of the two or more simultaneously visible segments determines the luminance of the individual ones of the two or more simultaneously visible segments.

4. A method according to claim 1 further comprising determining the available battery charge required to power said display and the individual ones of the two or more simultaneously visible segments.

5. A method according to claim 4 comprising setting the luminance of one of the individual ones of the two or more simultaneously visible segments in dependence on the available battery charge, a relative luminance of individual ones of the two or more simultaneously visible segments in dependence on their relative assigned importance levels and the available battery charge.

6. A method according to claim 4, further comprising predicting future battery usage and setting the luminance of the individual ones of the two or more simultaneously visible segments in dependence on the predicted future battery usage.

7. A method according to claim 6 wherein predicting the future battery usage comprises predicting anticipated user behaviour based on previous usage data of one or more users or one or more indirect triggers.

8. A method according to claim 1 wherein the individual ones of the two or more simultaneously visible segments is defined by software, and wherein one or more of a position and geometry of the individual ones of the two or more simultaneously visible segments varies in dependence on an operation of an underlying software application.

9. A method according to claim 1 wherein at least one of individual ones of the two or more simultaneously visible segments is defined by a particular physical area of the display, and wherein a geometry of the particular physical area is configurable.

10. A method according to claim 1 wherein the assigning of an importance level to a segment of individual ones of the two or more simultaneously visible segments is based on one or more user inputs; wherein the display is a touchscreen of a device and the one or more user inputs comprises at least one of: a pinch action on said display; finger proximity to the device; and movement of the device.

11. A method according to claim 1 wherein importance levels are assigned without any direct user interaction.

12. A method according to claim 11 wherein importance levels are one or more of determined or assigned based on at least one or more of the following: environmental conditions in which the display is located; a detected location of the display; a detected motion of the display; a user operating mode; and one or more of a nature or type of graphical interface elements being displayed.

13. A method according to claim 12 wherein importance levels are one or more of determined or assigned based on an ambient light level.

14. A method according to claim 12 wherein an importance level is assigned based on a calendar event; wherein a calendar application is assigned an importance level in dependence on the calendar event.

15. A method according to claim 12 wherein importance levels are one or more of determined or assigned based on received biometric data; wherein the biometric data comprises heart rate data.

16. A method according to claim 12 wherein an importance level is determined based on the information being displayed on a segment of the individual ones of the two or more simultaneously visible segments.

17. A device having a display, the device comprising: means for segmenting the display into two or more simultaneously visible segments; means for assigning an importance level to individual ones of the two or more simultaneously visible segments; and means for selectively setting a luminance of a segment of the individual ones of the two or more simultaneously visible segments in dependence on the assigned importance level and a predicted future battery usage.

18. A device according to claim 17, the device being portable; and comprising a smartphone or a wearable device.

19. A device according to claim 17 further comprising a user interface for segmenting the display into the two or more simultaneously visible segments.

20. A device according to claim 17 further comprising a user interface for assigning one or more importance levels to the two or more simultaneously visible segments.

* * * * *